(12) United States Patent
Kotlyar

(10) Patent No.: US 6,299,174 B1
(45) Date of Patent: Oct. 9, 2001

(54) MECHANICAL SEAL ASSEMBLY

(75) Inventor: Oleg M. Kotlyar, Salt Lake City, UT (US)

(73) Assignee: The United States as represented by the Department of Energy, Washington, DC (US)

(*) Notice: Subject to any disclaimer, the term of this patent is extended or adjusted under 35 U.S.C. 154(b) by 0 days.

(21) Appl. No.: 09/336,048

(22) Filed: Jun. 18, 1999

(51) Int. Cl.[7] ............................ F16J 15/34; F16G 33/76
(52) U.S. Cl. ........................ 277/358; 277/398; 277/370
(58) Field of Search .................. 277/358, 370, 277/390, 397, 398, 375

(56) References Cited

U.S. PATENT DOCUMENTS

| | | | | |
|---|---|---|---|---|
| Re. 22,353 | * | 7/1943 | Karlberg | 277/398 |
| 626,129 | * | 5/1899 | Badeker | 277/533 |
| 1,457,584 | * | 6/1923 | Mc Cuen | 277/398 X |
| 1,491,992 | * | 4/1924 | Mc Cuen | 277/399 X |
| 2,007,414 | * | 7/1935 | Weis et al. | 277/370 X |
| 2,111,200 | * | 3/1938 | Amourello | 277/398 X |
| 2,121,299 | * | 6/1938 | Peters | 277/398 X |
| 2,393,260 | * | 1/1946 | Pardee | 277/374 |
| 2,571,257 | * | 10/1951 | Kinsella | 277/395 |
| 2,744,774 | * | 5/1956 | Wist | 277/397 X |
| 3,712,765 | * | 1/1973 | Smith | 277/370 X |
| 3,796,507 | * | 3/1974 | Smykal et al. | 277/399 X |
| 3,838,939 | * | 10/1974 | Erickson et al. | 277/358 X |
| 3,889,983 | * | 6/1975 | Freize et al. | 277/358 X |
| 4,145,059 | * | 3/1979 | Imai et al. | 277/372 X |
| 4,169,603 | * | 10/1979 | Funk | 277/370 X |
| 4,171,819 | * | 10/1979 | Martineau | 277/398 |
| 4,241,927 | | 12/1980 | Wiese | 277/87 |
| 4,502,699 | * | 3/1985 | Mukerji | 277/398 |
| 4,558,873 | | 12/1985 | Berthiaume | 277/403 |
| 4,795,168 | * | 1/1989 | Adams et al. | 277/378 |
| 4,819,950 | | 4/1989 | Winslow | 277/93 SD |
| 4,854,743 | * | 8/1989 | Sexton et al. | 277/370 X |
| 5,026,077 | * | 6/1991 | Warner | 277/398 |
| 5,344,164 | | 9/1994 | Carmody et al. | 277/371 |
| 5,762,342 | | 6/1998 | Kakabaker et al. | 277/306 |

FOREIGN PATENT DOCUMENTS

| | | | | |
|---|---|---|---|---|
| 003 | * | of 1901 | (GB) | 277/370 |
| 508629 | | 3/1976 | (SU) . | |

* cited by examiner

Primary Examiner—Lynne H. Browne
Assistant Examiner—Robert G. Santos
(74) Attorney, Agent, or Firm—Mark LaMarre; Daniel Park; Virginia B. Caress

(57) ABSTRACT

An improved mechanical seal assembly is provided for sealing rotating shafts with respect to their shaft housings, wherein the rotating shafts are subject to substantial axial vibrations. The mechanical seal assembly generally includes a rotating sealing ring fixed to the shaft, a non-rotating sealing ring adjacent to and in close contact with the rotating sealing ring for forming an annular seal about the shaft, and a mechanical diode element that applies a biasing force to the non-rotating sealing ring by means of hemispherical joint. The alignment of the mechanical diode with respect to the sealing rings is maintained by a series of linear bearings positioned axially along a desired length of the mechanical diode. Alternative embodiments include mechanical or hydraulic amplification components for amplifying axial displacement of the non-rotating sealing ring and transferring it to the mechanical diode.

7 Claims, 4 Drawing Sheets

$$K_{ampl} = \frac{b}{a}$$

SECTION A-A

MECHANICAL SEAL ASSEMBLY

CONTRACTUAL ORIGIN OF THE INVENTION

The United States Government has rights in this invention pursuant to Contract Number DE-AC07-76ID01570 between the United States Department of Energy and Idaho National Engineering Laboratory, as represented by Lockheed Martin Idaho Technologies Company.

TECHNICAL FIELD

The present invention relates to a mechanical seal assembly, and more particularly, to an improved mechanical seal assembly designed for installation in dynamic applications, wherein the rotating shaft experiences substantial axial vibrations.

BACKGROUND OF INVENTION

Various mechanical seals have been designed to provide a seal between a rotating shaft and its housing to prevent leakage of fluid between the shaft and the housing. Generally, mechanical seal assemblies are an arrangement of rotating (R) and non-rotating (NR) sealing rings that are positioned about the rotating shaft and maintained in close contact by a biasing force. The sealing rings have flat seal faces that, when forced together, create an annular seal about the shaft. A typical mechanical seal assembly includes a single R sealing ring locked to the rotating shaft, forming the end of the seal, and a single movable, NR sealing ring adjacent to the rotating sealing ring. The biasing force is applied to the back face of the NR sealing ring, for example by means of a spring, to urge the sealing rings into close sealing contact. Alternatively, bellows may also be used to apply the biasing force, or it is further known to use a controlled pressurized fluid.

Many problems are associated with state-of-the-art mechanical seal designs. First, mechanical seals have a high level of complexity and numerous parts, resulting in frequent malfunction, disassembly, and repair. In designs employing springs, problems occur with non-uniform loading and the application of an insufficient biasing force due to wear between the contacting seal face surfaces of the sealing rings. It is also difficult to maintain the sealing rings in a concentric relationship relative to the shaft, resulting in misalignment between the parts that disrupts the sealing contact between the sealing rings.

Maintaining sealing rings in permanent contact is especially problematic in dynamic applications characterized by strong axial shaft vibrations. Simply increasing the biasing force to counter the disruptive axial vibrations may cause significant heat generation between the contacting surfaces, distortion of or cracks in the sealing rings, and ultimately, mechanical seal failure. Another response is to utilize the NR sealing ring as a mechanical diode, such that the NR sealing ring is restricted to axial movement in the direction of the R sealing ring only, by providing the NR sealing ring with a cylindrical extension from its back face that also encircles the shaft, disposing balls or other wedging elements between the outer surface of the cylindrical extension and an internal conical section of the housing, and using springs disposed between the balls and the NR sealing ring to apply a constant force to both the NR sealing ring and balls to provide sealing contact between the sealing rings, and to prevent any disconnection of the sealing rings. Unfortunately, adapting the NR sealing ring to function as a mechanical diode does not correct misalignment problems, with respect to the sealing rings about the shaft, or address the need for the mechanical seal assembly to be sensitive to axial displacement of the mechanical diode itself, such that disconnection of the sealing rings and undesirable leakage of fluid from the seal is identified as early as possible and avoided.

A need in the art exists for a mechanical seal with reliable sealing contact between the sealing rings, especially in dynamic applications where the shaft and mechanical seal assembly are subjected to substantial axial vibrations (e.g., bore-hole drilling equipment).

The present invention is an improved mechanical seal assembly that includes a mechanical diode element, separate from the sealing rings, and also incorporates a hemispherical joint into the design of the mechanical diode for connecting the mechanical diode to a NR sealing ring. Significantly, the hemispherical joint allows for self-adjustment of the NR sealing ring about the shaft to ensure sufficient sealing contact between the NR and R sealing rings. A series of linear bearings are positioned axially adjacent to the mechanical diode for maintaining the alignment of the mechanical diode with the shaft and housing. An annular mechanical seal assembly housing may also be provided to contain the mechanical diode element, or a bellows connection may be used to contain the mechanical diode element, while also preventing rotation of the NR sealing ring and simplifying the mechanical seal assembly design.

In an alternate embodiment, the mechanical seal includes a mechanical amplifier of NR sealing ring axial movement comprised of a lever and connecting link, such that the mechanical diode readily identifies any axial movement of the NR sealing ring and prevents any disconnections of the sealing rings.

In yet another embodiment, the mechanical seal includes a hydraulic amplifier of NR sealing ring axial movement comprised of a pressurized fluid chamber, in combination with the NR sealing ring and the mechanical diode, such that the mechanical diode readily identifies any axial movement of the NR sealing rings and prevents any disconnections of the sealing rings.

Therefore, in view of the above, a basic object of the present invention is to provide an improved mechanical seal assembly that incorporates a hemispherical joint into a mechanical diode design to significantly increase the reliability of the mechanical seal, particularly in dynamic applications.

Another object of this invention is to provide an improved mechanical seal assembly having a NR sealing ring that is self-adjusting to provide good sealing contact with the R sealing ring, regardless of any misalignment between the mechanical diode and the NR and R sealing rings.

Another object of this invention is to provide an improved mechanical seal assembly that affords early detection of any disconnection between the NR and R sealing rings.

Yet another object of this invention is to provide an improved mechanical seal assembly that prevents any disconnection between the NR and R sealing rings by means of a mechanical amplifier of the NR sealing ring axial displacement.

Yet another object of this invention is to provide an improved mechanical seal assembly that prevents any disconnection between the non-rotating and rotating sealing rings by means of a hydraulic amplifier of the NR sealing ring axial displacement.

A further object of this invention is to provide an improved mechanical seal assembly that increases the sensitivity of a mechanical diode component to axial displacement of the mechanical diode itself, such that the mechanical seal is significantly more reliable when subjected to axial vibrations of the shaft.

Additional objects, advantages, and novel features of the invention are set forth in the description below and/or will become apparent to those skilled in the art upon examination of the description below and/or by practice of the invention. The objects, advantages, and novel features of the invention may be realized and attained by means of instrumentation and combinations particularly pointed out in the appended claims.

BRIEF SUMMARY OF THE INVENTION

Briefly, this invention is an improved mechanical seal assembly that provides a reliable seal between a rotating shaft and its housing by incorporating a hemispherical joint between a mechanical diode and a non-rotating (NR) sealing ring. The mechanical diode generally includes a sleeve encircling and extending along a desired length of the rotating shaft and terminating in an annular joint member also encircling the shaft. The annular joint member has a concave, hemispherical radial surface that is shaped to fittingly receive a convex, hemispherical radial surface of a non-rotating sealing ring, thereby forming an annular hemispherical joint about the shaft. At least one spring acts upon the annular joint member of the mechanical diode, such that the NR sealing ring is maintained in reliable sealing contact with a rotating (R) sealing ring by the mechanical diode via the spherical joint. The combination of the mechanical diode with the annular hemispherical joint provides freedom to the NR sealing ring for self-adjustment and reliable contact between the NR and R sealing rings, regardless of any misalignment of the mechanical diode and the NR sealing ring.

Preferably, the alignment of the mechanical diode about the rotating shaft is maintained by a series of linear bearings positioned axially along the sleeve of the mechanical diode. For additional flexibility, a bellows connection may be provided between the housing and a NR sealing ring, such that the mechanical diode is disposed within the interior of the bellows.

In an alternative embodiment, the improved mechanical seal includes a mechanical amplifier for amplifying axial movement of the NR sealing ring. The mechanical amplifier is generally comprised of link and lever members for connecting the mechanical diode to the NR sealing ring, increasing the sensitivity of the mechanical diode to any axial displacement of the NR sealing ring away from the R sealing ring, as well as incidental axial displacement of the mechanical diode itself. The mechanical diode responds to limit the axial movement of the NR sealing ring, resulting in early detection and correction of any disconnections between the sealing rings.

In yet another embodiment, the improved mechanical seal assembly includes a hydraulic amplifier for amplifying axial movement of the NR sealing ring. Hydraulic amplification is accomplished using an annular fluid chamber, preferably filled with oil, in combination with the back face of the NR sealing ring and the sleeve of the mechanical diode. The fluid is displaced by axial motion of the NR sealing ring, for example, axial motion caused by shaft vibration, and the resulting displacement of fluid within is transferred to the mechanical diode, which stops the NR sealing ring axial movement at its earliest phase.

BRIEF DESCRIPTION OF THE DRAWINGS

The appended claims set forth those novel features which characterize the invention, however, the invention itself, as well as further objects and advantages thereof, will best be understood with reference to the following detailed description of a preferred embodiment, in conjunction with the accompanying drawings, where like reference characters identify like elements throughout the various figures, in which:

DETAILED DESCRIPTION OF THE INVENTION

The present invention relates to an improved mechanical seal for sealing rotating shafts with respect to their shaft housings, wherein the rotating shafts are subject to substantial axial vibrations. Generally, the mechanical seal assembly includes at least one non-rotating (NR) sealing ring and at least one adjacent rotating (R) sealing ring positioned axially about the shaft. The sealing rings have opposing, preferably flat, radial seal face surfaces that are urged into close contact to form a reliable seal. The improved design includes a mechanical diode element that applies a biasing force to the NR sealing ring via a hemispherical joint. The alignment of the mechanical diode with respect to the shaft and the housing is maintained by a series of linear bearings positioned axially along a desired length of the mechanical diode.

Figure 1:
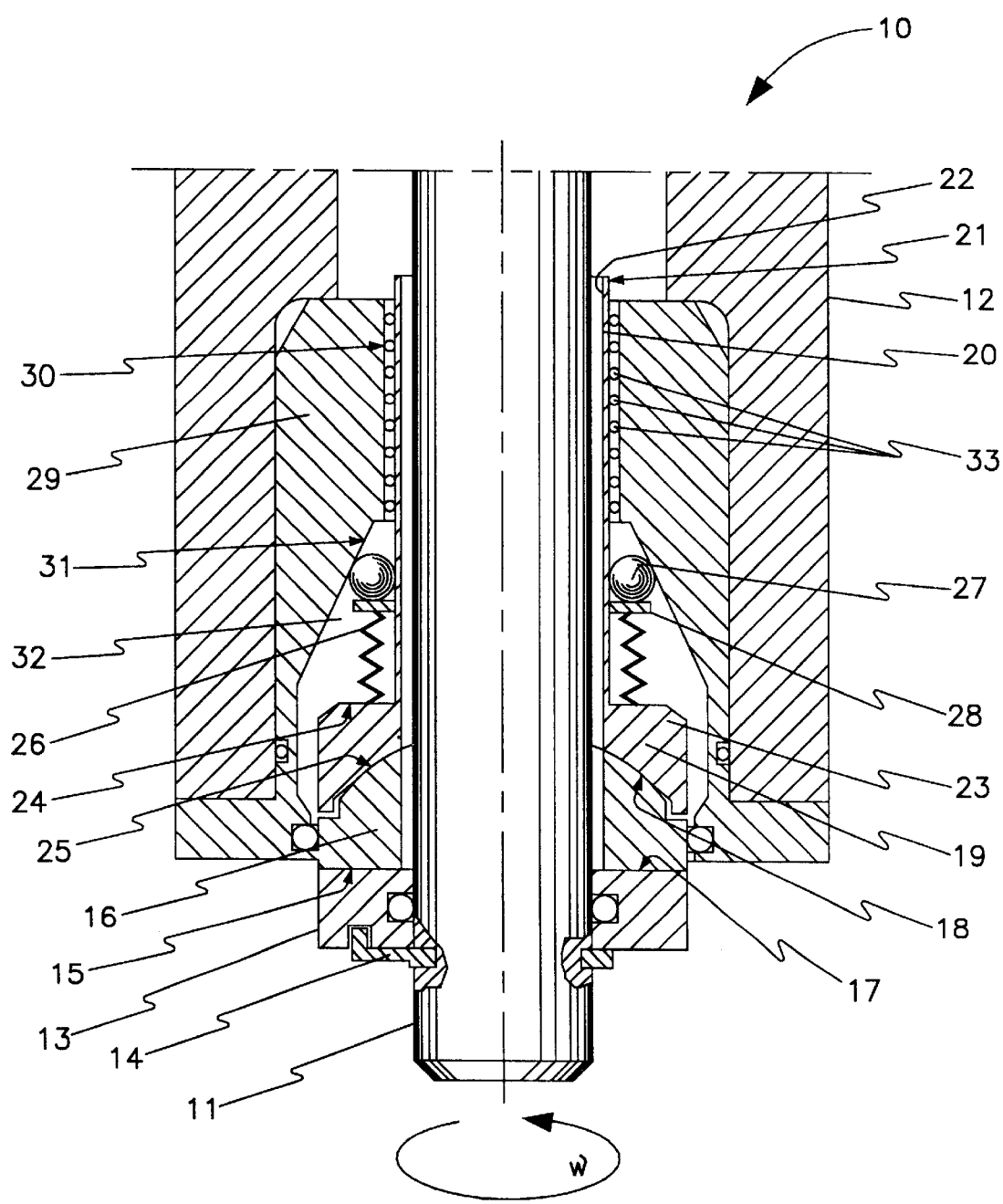
FIG. 1 shows the preferred embodiment of the mechanical seal, including the hemispherical joint.

FIG. 1 shows the preferred embodiment of the improved mechanical seal assembly 10. A rotating shaft 111 having a longitudinal axis of rotation extends through a housing 12. An annular R sealing ring 13 is fixed about the shaft 11 by a connecting means 14 (e.g., key, lock), such that the R sealing ring 13 rotates with the shaft 11, and no axial movement of the R sealing ring 13 along the shaft 11 is possible. Preferably, the R sealing ring 13 forms the end of the seal assembly 10, however, additional sealing rings may be provided. The R sealing ring 13 has a generally flat, radially extending seal face surface 15.

A non-rotating sealing (NR) ring 16 having a generally flat, radially extending seal face surface 17 is disposed about the shaft 11 and positioned adjacent to the R sealing ring 13. The NR sealing ring 15 is not fixed about the shaft 11, nor does it rotate with shaft 11. (Components for preventing the NR sealing ring from rotating with the shaft are not shown). The seal face surfaces 15, 17 of the R and NR sealing rings 13, 16 are coaxially aligned and axially adjacent about the shaft 11, such that a seal is formed when the seal face surfaces 15, 17 are biased or urged into close contact. Importantly, the NR sealing ring 16 has a radially extending back face surface 18, opposed to its seal face surface 17 and having a convex shape, such that the NR sealing ring 16 is hemispherical in form, with the shaft 11 passing through its axis or pole. Shaft supporting bearings (not shown) may be provided. The sealing rings are preferably constructed from hard material, e.g., steel, carbon, tungsten carbide, etc.

A mechanical diode 19, a mechanical seal assembly component that moves only in a single direction toward the R and NR sealing rings 13, 16 along the rotational axis of the shaft 11, is provided to resiliently urge the seal face surfaces 15, 17 of the R and NR sealing rings 13, 16 into continuous and close sealing contact. The mechanical diode 19 preferably includes a sleeve 20, or cylinder, surrounding the shaft 11 and terminating in an annular joint member 23. The sleeve 20 has an interior surface 22 adjacent to the shaft 11 and an exterior surface 21. The annular joint member 23 extends radially from the sleeve 20, such that two opposing radial surfaces are defined: an annular spring surface 24, which is proximate to the sleeve 20, and a concave surface 25 remote from the sleeve 20. Preferably, the sleeve 20 and annular joint member 23 are a single, continuous element. The concave surface 25 of the annular joint member 23 forms the impression of hemispherical shape for receiving the convex surface of the back face 18 of the NR sealing ring 16. In this way, the annular joint member 23 and the NR sealing ring 16 cooperate to define a hemispherical joint that solves the misalignment problems experienced in prior art mechanical seal assembly designs.

A biasing force is applied to the mechanical diode 19 to maintain the seal faces 15, 17 of the sealing rings 13, 16 in sealing contact via the hemispherical joint, preferably by at least one spring 26. The spring(s) 26 extends adjacent to the exterior surface 21 of the sleeve 20 of the mechanical diode 19, and is connected at one end to the annular joint member spring surface 24 of the mechanical diode 19 and at its other end to a wedging element(s) 27 (e.g., balls), by way of a separator 28.

According to the present embodiment, an annular mechanical seal assembly housing 29 is disposed between the housing 12 (e.g., bore-hole drilling equipment) and the shaft 11 to facilitate the positioning about the shaft 11 of the mechanical diode 19 and related biasing force components, such as the spring(s) 26, the wedging element(s) 27, and the separator 28 (e.g., the mechanical diode assembly). The mechanical seal assembly housing 29 generally has an internal cylindrical surface 30 that encloses a section of the mechanical diode sleeve 20, however, at a point proximate to the wedging element(s) 27, the internal cylindrical surface 30 of the mechanical seal assembly housing 29 becomes an internal conical surface 31, such that the cone opens toward the R and NR sealing rings 13, 16, and an annular conical cavity 32 is defined for enclosing the mechanical diode assembly. The wedging element(s) 27, positioned within the tapered end of the conical cavity 32, is in permanent contact with both the exterior surface 21 of the mechanical diode sleeve 20 and the internal conical surface 32 of the mechanical seal assembly housing 29. The conical cavity 32 is preferably filled with a fluid, e.g., oil.

Another feature of the present embodiment of the mechanical diode assembly is a series of linear bearings 33 disposed between the exterior surface 21 of the sleeve 20 of the mechanical diode 19 and the internal cylindrical surface 30 of the mechanical seal assembly housing 29, for maintaining the alignment of the mechanical diode 19 and the shaft 11. The combination of the mechanical diode 19, the hemispherical joint, and the linear bearings 33 provides improved self-adjustment capability of the mechanical seal assembly components and significantly increases the reliability of the mechanical seal assembly 10. In this way, good sealing contact is maintained between the NR and R seal faces 15, 17, regardless of the misalignment between the mechanical diode 19 and the R sealing ring 13.

Figure 2:
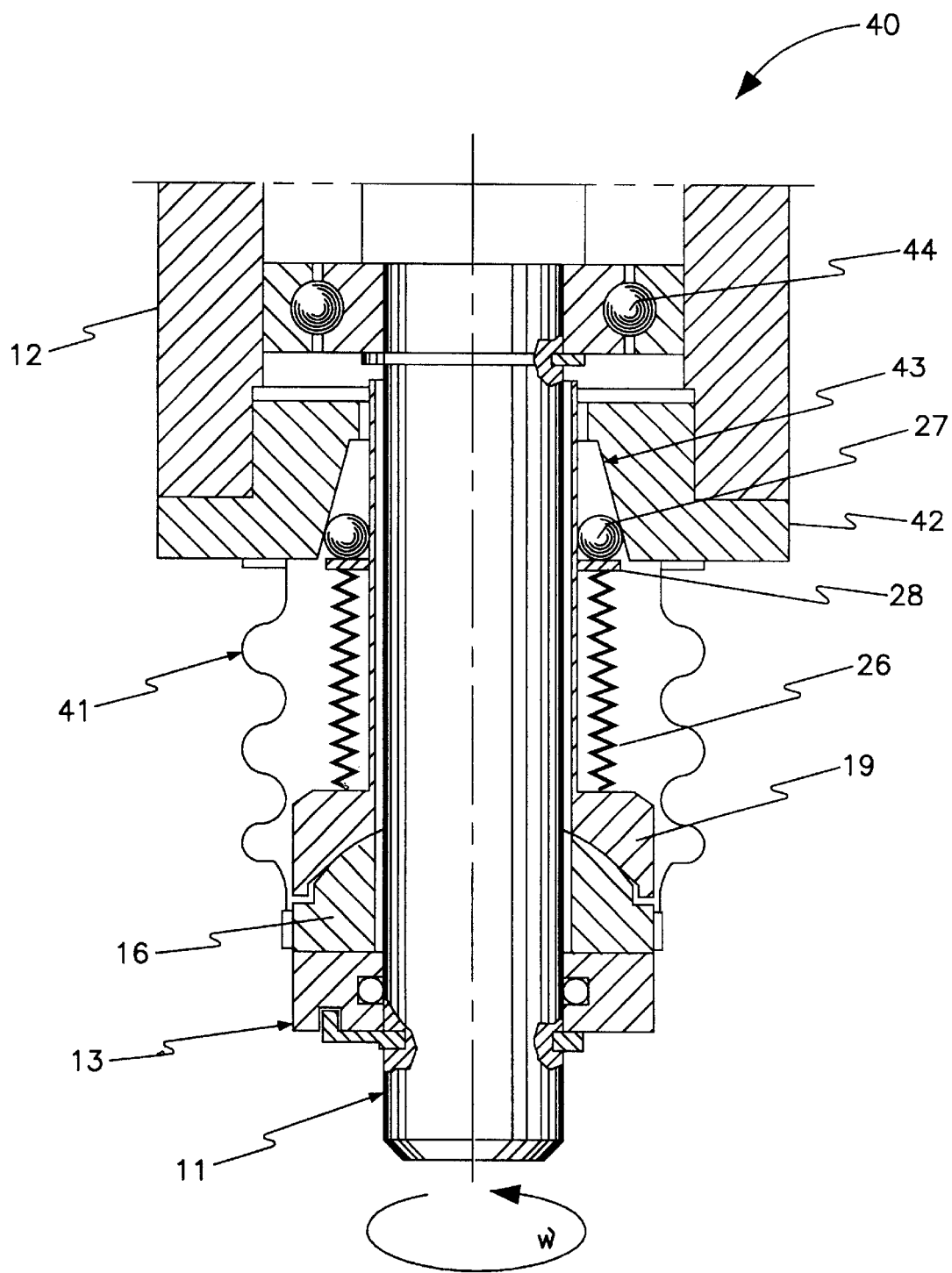
FIG. 2 shows an alternate embodiment of the mechanical seal, including the hemispherical joint and bellows.

FIG. 2 shows an alternative embodiment 40, wherein a bellows connection 41 is provided to connect the NR sealing ring 16 to an annular cover 42 positioned at the end of the housing 12. The bellows connection 41 is a flexible, accordion-like tube that encompasses the shaft 11 as a sleeve, and expands and contracts along the rotational axis of the shaft 11. The mechanical diode assembly (i.e., the mechanical diode 19 and related biasing force components: spring(s) 26, wedging element(s) 27, and separator 28), is contained within the bellows 41, which is preferably filled with oil. Similar to the mechanical seal assembly housing 29 described above, the annular cover 42 has an internal conical surface 43 for receiving the wedging element(s) 27. Shaft bearings 44 may be provided between the rotating shaft 11 and the housing 12 to properly align the shaft 11 within the housing 12. This design 40 allows for a shorter housing 12 and greater simplicity.

Figure 3A:
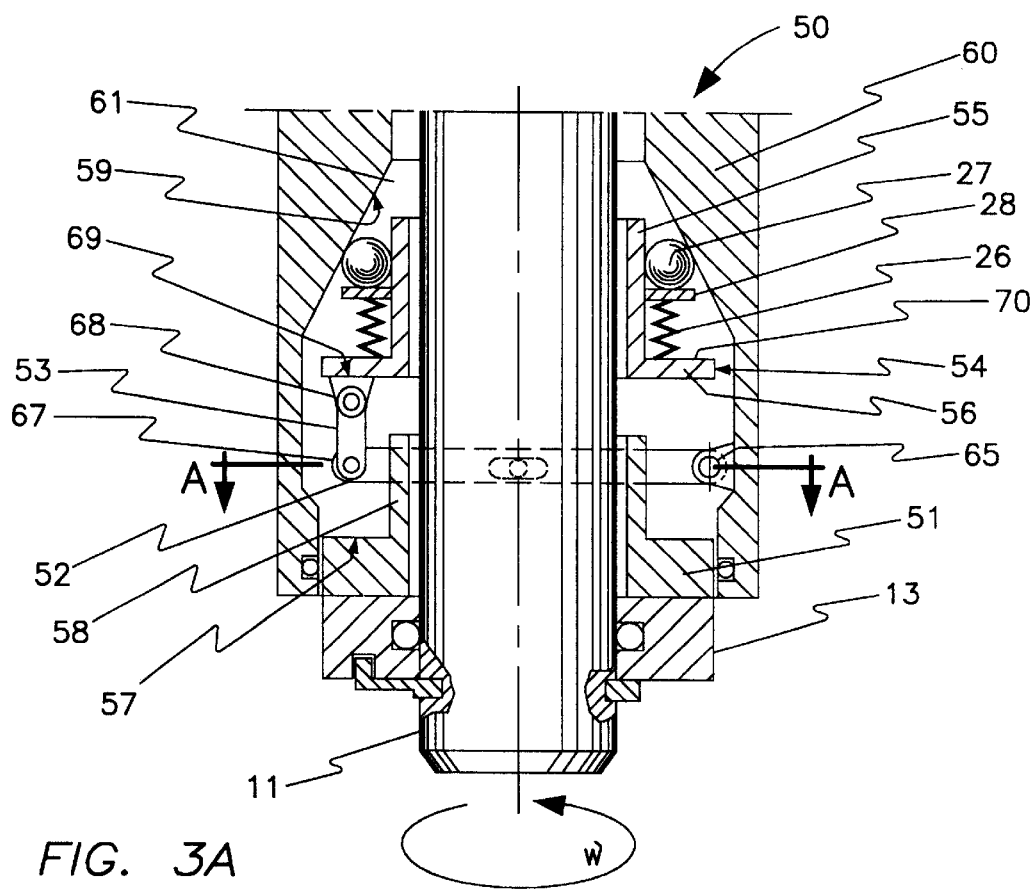
FIGS. 3A and 3B show an alternate embodiment of the mechanical seal, including non-rotating sealing ring displacement mechanical amplification means.
Figure 3B:
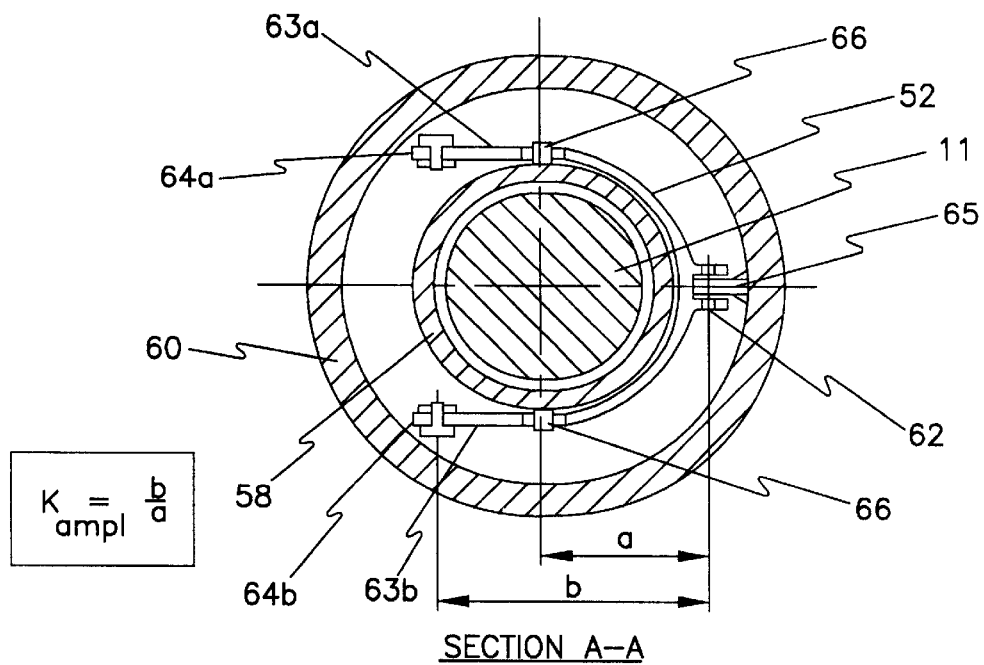

FIGS. 3A and 3B show an alternate embodiment 50 of the improved mechanical seal assembly, including elements for mechanically amplifying any axial displacement of the NR sealing ring, such that any disconnection between the NR and R sealing ring seal faces is detected quickly and prevented.

The mechanical seal assembly 50 accomplishes mechanical amplification of axial movement of a NR sealing ring 51 with lever and link members 52, 53 that connect a mechanical diode 54 to the NR sealing ring 51, as shown in FIG. 3A. The NR sealing ring 51 has a flange, or preferably a cylindrical sleeve 58 encircling the shaft 11, extending from its back face 57 for such connection purposes. As described with respect to the previous embodiments, the mechanical diode 54 preferably includes a sleeve 55 and a flange 56 that extends radially from the sleeve 55 to provide a surface 70 for the attachment of at least one spring 26. The spring 26 is attached at its other end to the separator 25 of a wedging element(s), e.g., balls 26. The balls 26 are maintained in a seated position between the mechanical diode sleeve 55 and a conically shaped interior surface 59 of the housing 60, as shown, or alternatively, between the mechanical diode sleeve 55 and a mechanical diode assembly housing (not shown). The housing 60 defines a conical cavity 61, preferably filled with oil, that contains the mechanical diode assembly and the lever and link members 52, 53.

As illustrated in FIGS. 3A and 3B, the lever 52 is preferably a unshaped member, as shown, or most preferably a ring encircling the shaft. The unshaped lever has a midpoint 62 and two arms 63a, 63b, each having a terminating end 64a, 64b. The lever 52 is positioned about the sleeve 58 of the NR sealing ring 51, such that the lever arms 63a, 63b extend around the sleeve 58, and the plane defined by the lever's midpoint 62 and terminating ends 64a, 64b is approximately normal to the axis of the shaft 11. The lever 52 is connected to the housing 60 at its midpoint 62 by a hinge 65, and each arm of the lever 63a, 63b is connected by a pivot, e.g., a pin 66, to the NR sealing ring sleeve 58. At least one of the terminating ends 64a, 64b of the lever 52 is connected to a first end 67 of the link member 53. Alternatively, two link members 53 may be provided for connection to the first and second terminating ends 64a, 64b of the lever 52. The second end 68 of the link member(s) 53 is connected to the flange 56 of the mechanical diode 54, at the surface 69 opposed to the spring connection surface 70.

The lever and link members 52, 53 function as a "mechanical amplifier" of any axial displacement of the NR sealing ring 51. For example, axial movement of the NR sealing ring 51 away from an adjacent R sealing ring and along the shaft 11 is transferred to the mechanical diode 54 and amplified by a factor of $K=b/a$, where K is a coefficient of amplification, a is the distance between the hinge 65 and the center of the shaft 11, and b is the distance between the hinge 65 and the end of the lever 64a, 64b connected to the first end 67 of the link 53. Such amplification of the axial movement of the NR sealing ring 51 transferred to the mechanical diode 54 allows the mechanical diode 54 to stop the movement of the NR sealing ring 51 at its earliest phase. Simultaneously, the mechanical diode 54, by way of the mechanical amplifier, applies an increased force F (by K times, where force $F=F_{spring} \times K$) against the NR sealing ring 51, by way of the balls 27 and spring(s) 26, thereby preventing disconnection of the sealing rings 13, 51. The mechanical amplifier increases the sensitivity of the mechanical seal diode 54 to axial shaft vibrations, thereby significantly improving the reliability of the seal in dynamic applications characterized by substantial axial shaft vibration.

Figure 4:
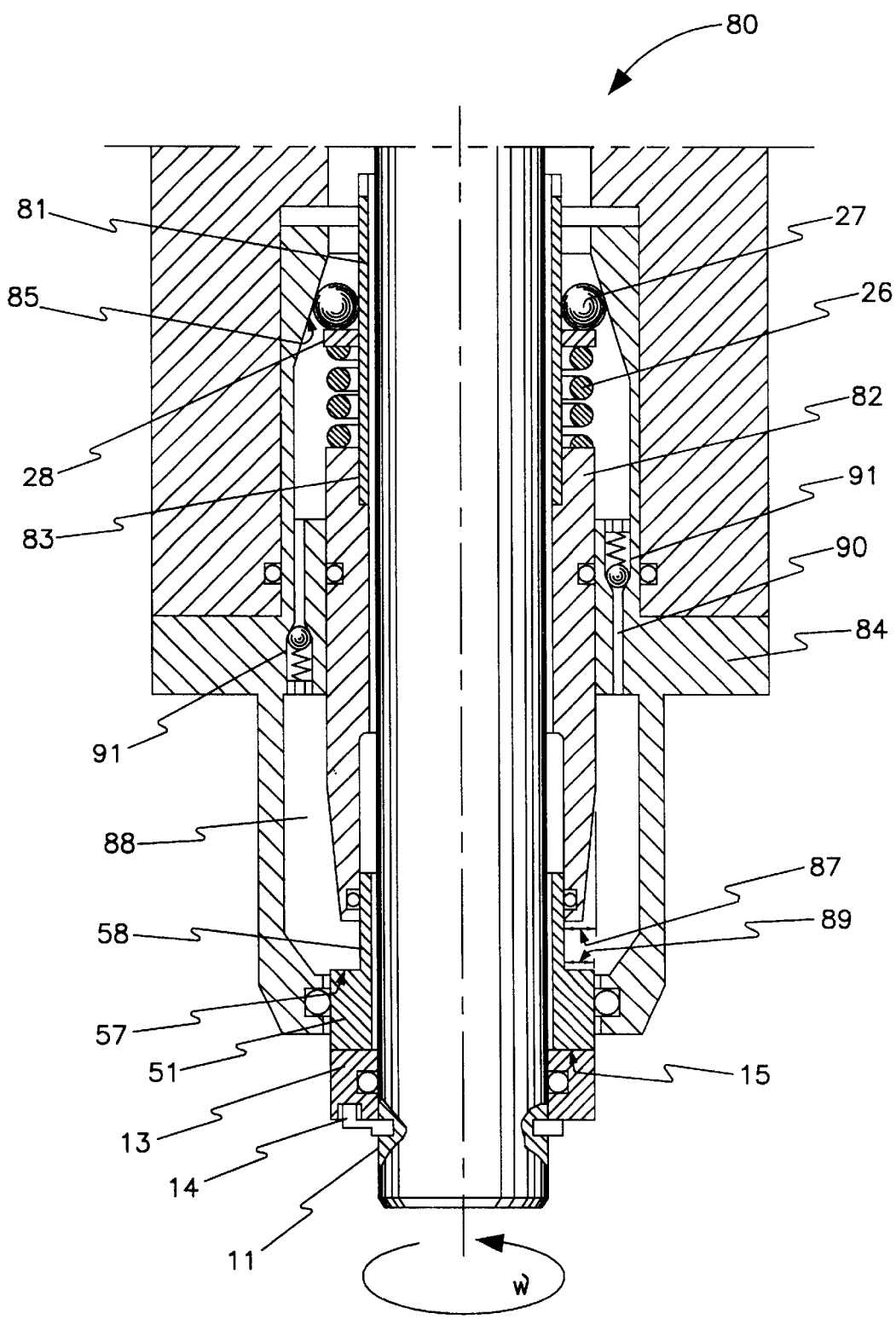
FIG. 4 shows another embodiment of the mechanical seal, including non-rotating sealing ring displacement hydraulic amplification means.

In yet another embodiment, as shown in FIG. 4, the improved mechanical seal includes a hydraulic amplifier 80 of the NR sealing ring 51 axial movement, such that axial displacement of the NR sealing ring 51 is stopped at an early phase. Preferably, the NR sealing ring 51 has a cylindrical sleeve 58 encircling the shaft 11 and extending from its back face 57. In the present embodiment, the mechanical diode 81 is generally comprised of a cylinder encircling the shaft. A sleeve member 82 also encircling the shaft 11 is provided along the shaft 11 between the mechanical diode 81 and the NR sealing ring 51. Preferably, the first end of the sleeve member 82 overlaps a fraction of the NR sealing ring sleeve 58, and the second end of the sleeve member 82 is connected, e.g., by thread 83, to the mechanical diode 81.

A mechanical seal assembly housing 84 is provided to contain the mechanical diode sleeve member 82, and back face 57 of the NR sealing ring 51 within a fluid chamber 88. A biasing spring's force is applied by springs(s) 26 to the mechanical diode 81 and attached sleeve member 82, to urge the NR sealing ring 51 into continuous contact with the R sealing ring 13. The biasing force is transferred from the sleeve member 82 to the back face 57 of the NR sealing ring 51 via the fluid (e.g., oil) of the fluid chamber 88, contained within the mechanical seal assembly housing 84. As described with respect to the previous embodiments, separator 28 is positioned between balls 27 and spring(s) 26. The balls 27 are pressed against conical surface 85.

Importantly, the surface area 87 of the first end of the sleeve member 82, represented by $A_{sl}$, is less than the surface area 89 of the back face 57 of the NR sealing ring 51, represented by $A_{nr}$, such that the resulting biasing force applied to the NR sealing ring 51 is K times greater than the force of the spring 26, where K is a coefficient of force amplification and $K=A_{nr}/A_{sl}$. When the mechanical seal assembly 80 is subjected to axial vibrations along the shaft 11, the force of inertia applied to the NR sealing ring 51 acts to move the NR sealing ring 51 away from the R sealing ring 13, pressurizing the fluid in the fluid chamber 88. The pressurized fluid acts upon the sleeve member 82 and ultimately results in a wedging action of the mechanical diode 81 that halts axial displacement of the mechanical diode 81 and the NR sealing ring 51 at its earliest phase. Advantageously, in this case, the hydraulic amplifier, including the NR sealing ring 51, the sleeve member 82, and the fluid within the fluid chamber 88 of the mechanical seal assembly housing 84, amplifies any axial movement of the NR sealing ring by a factor of K, while reducing the force applied to the sleeve member 82.

The mechanical seal assembly housing 84 may further include fluid channels 90 containing safety or check valves 91, positioned adjacent to the sleeve member 82 and between the mechanical diode assembly (i.e., the mechanical diode 81 and related biasing force components, e.g., springs 26, wedging elements 27, and separators 28) and the NR sealing ring 51, for controlling the pressure of the fluid within the mechanical seal assembly housing 84.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A mechanical seal assembly for providing an annular seal between a rotating shaft and a housing, comprising:
   a rotating sealing ring having a seal face and fixedly positioned about the shaft, such that said rotating sealing ring rotates with the shaft;
   a non-rotating sealing ring having a seal face and an opposing back face having a convex, hemispherically shaped surface, said non-rotating sealing ring positioned about the shaft and adjacent to said rotating sealing ring, such that said sealing ring seal faces are in contact forming an annular seal therebetween;
   a mechanical diode limited to movement along the shaft in the direction of said non-rotating sealing ring and comprised of an annular joint member having a concave, hemispherically shaped surface, said mechanical diode positioned about the shaft and adjacent to said non-rotating sealing ring, such that said concave surface of said mechanical diode's annular joint member and said convex surface of said non-rotating sealing ring's back face cooperate to form an annular hemispherical joint; wherein said mechanical diode further comprises a sleeve member encircling the shaft and terminating in said annular joint member,
   means for applying a force to said mechanical diode, such that said sealing rings are urged into sealing contact via the hemispherical joint, and
   bearings which are positioned linearly and parallel to the axis of the shaft, between said sleeve member and the housing to maintain the alignment of said mechanical diode, said rotating sealing ring, and the rotating shaft.

2. The mechanical seal assembly according to claim 1, wherein said sealing ring seal faces extend radially from the shaft and have generally flat surfaces approximately normal to the shaft's axis of rotation.

3. The mechanical seal assembly according to claim 1, wherein said force application means is at least one spring that acts upon said annular joint member of said mechanical diode.

4. The mechanical seal assembly according to claim 3, wherein a first end of said spring is connected to said annular joint member of said mechanical diode and a second end of said spring is connected to wedging elements.

5. The mechanical seal assembly according to claim 1, wherein a bellow having a first end connected to the housing and a second end connected to said non-rotating sealing ring encloses said mechanical diode and said force application means about the shaft.

6. A mechanical seal assembly for providing an improved annular seal between a rotating shaft and a housing, comprising:

a rotating sealing ring having a seal face and fixedly positioned about the shaft, such that said rotating sealing ring rotates with the shaft;

a non-rotating sealing ring having a seal face and an opposing back face having a convex, hemispherically shaped surface, said non-rotating sealing ring positioned about the shaft and adjacent to said rotating sealing ring, such that said sealing ring seal faces are in contact forming an annular seal therebetween;

a mechanical diode positioned about the shaft adjacent to said non-rotating sealing ring, said mechanical diode limited to movement along the shaft in the direction of said non-rotating sealing ring, and comprised of a sleeve member encircling the shaft and terminating in an annular joint member, said an annular joint member having a concave, hemispherically shaped surface, such that said concave surface of said mechanical diode's annular joint member and said convex surface of said non-rotating sealing ring's back face cooperate to form an annular hemispherical joint; and bearings positioned linearly and parallel to the axis of the shaft, between said sleeve member and the housing to maintain the alignment of said mechanical diode and said rotating sealing ring; and means for applying a force to said mechanical diode, such that said sealing rings are urged into sealing contact via the hemispherical joint.

7. The mechanical seal assembly according to claim 6, wherein said force application means is at least one spring that acts upon said annular joint member of said mechanical diode.

* * * * *